(12) United States Patent
Kamepalli et al.

(10) Patent No.: US 10,852,843 B1
(45) Date of Patent: Dec. 1, 2020

(54) DETECTING HOVERING KEYPRESSES BASED ON USER BEHAVIOR

(71) Applicant: Dell Products, L.P., Round Rock, TX (US)

(72) Inventors: Srinivas Kamepalli, Austin, TX (US); Deeder M. Aurongzeb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/408,163

(22) Filed: May 9, 2019

(51) Int. Cl.
*G06F 1/16* (2006.01)
*G06F 3/044* (2006.01)
*G06F 3/02* (2006.01)
*G06N 20/00* (2019.01)

(52) U.S. Cl.
CPC .............. *G06F 3/021* (2013.01); *G06N 20/00* (2019.01)

(58) Field of Classification Search
CPC ................... G06F 3/044; G06F 1/1624; G06F 1/1662–1698; G06F 3/014–03; G06F 3/04886
See application file for complete search history.

(56) References Cited

U.S. PATENT DOCUMENTS

| 2011/0164060 | A1* | 7/2011 | Miyazawa | G06F 3/0488 345/660 |
| 2013/0103207 | A1* | 4/2013 | Ruff | F24F 11/50 700/278 |
| 2015/0177945 | A1* | 6/2015 | Sengupta | G06F 3/0488 715/744 |
| 2015/0185869 | A1* | 7/2015 | Chng | G06F 1/1662 345/168 |
| 2015/0185886 | A1* | 7/2015 | Truong | G06F 3/0416 345/173 |
| 2015/0205400 | A1* | 7/2015 | Hwang | G06F 3/0488 345/654 |

* cited by examiner

Primary Examiner — Sanghyuk Park
(74) Attorney, Agent, or Firm — Fogarty LLP

(57) ABSTRACT

Systems and methods for dynamically predicting keypresses on a hovering keyboard based on user behavior are described. In some embodiments, an Information Handling System (IHS) may include a processor and a memory coupled to the processor, the memory having program instructions stored thereon that, upon execution by the processor, cause the IHS to: configure a travel distance for hovering events detectable by a keyboard coupled to the IHS, and modify the travel distance in response to a user's behavior.

20 Claims, 3 Drawing Sheets

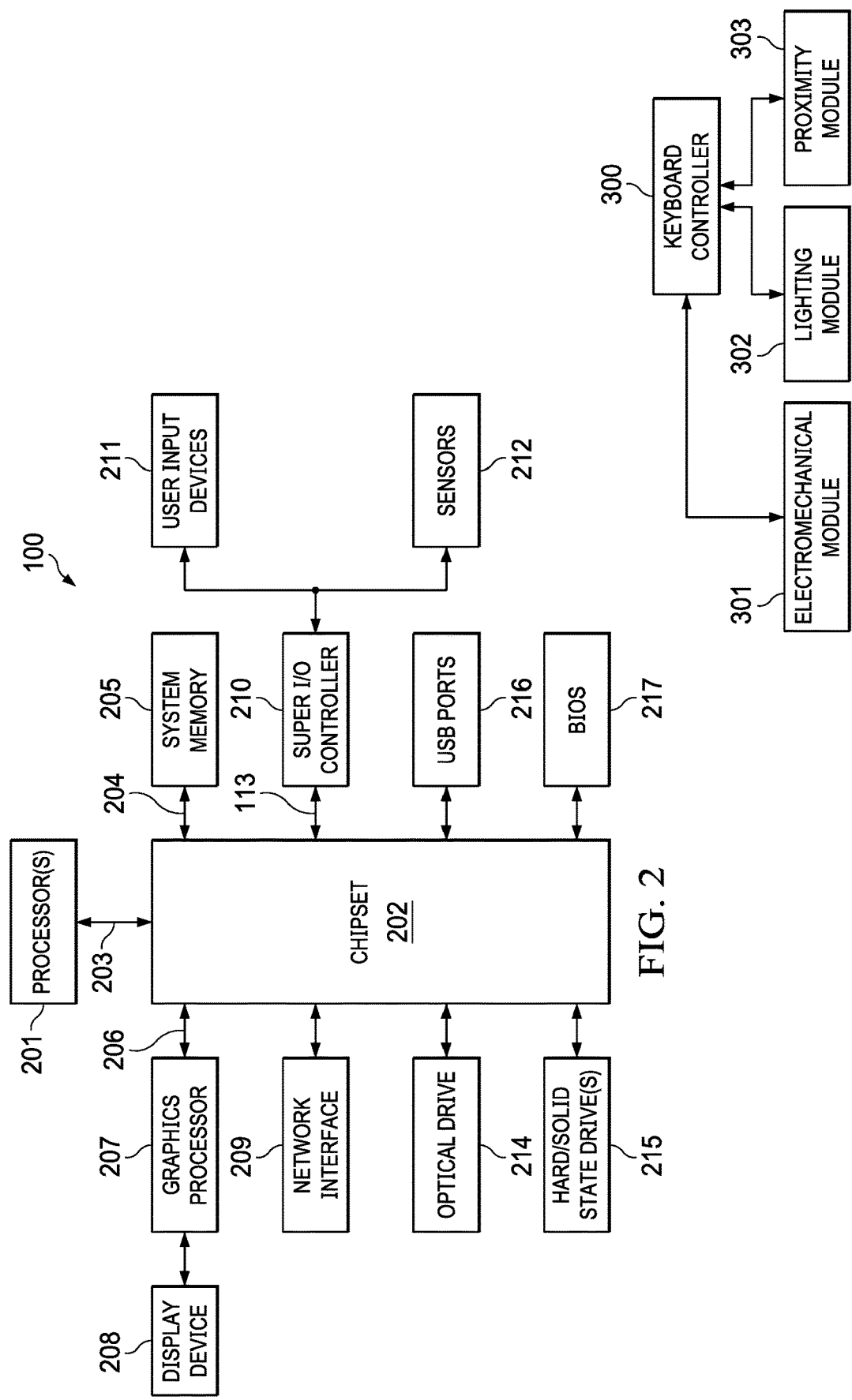

DETECTING HOVERING KEYPRESSES BASED ON USER BEHAVIOR

FIELD

This disclosure relates generally to Information Handling Systems (IHSs), and more specifically, to systems and methods for dynamically predicting keypresses on a hovering keyboard based on user behavior.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In various implementations, IHSs process information received via a keyboard. A conventional keyboard includes components such as scissor switch keys, dome switch keys, levers, membranes, bucking springs, etc. These components are configured to receive physical keystrokes when a user actually touches and/or presses the keyboard's keys.

In addition, certain types of keyboards now also come equipped with proximity sensors. These proximity sensors are configured to measure distances between the user's hand or fingers to the keyboard. In operation, such a keyboard can detect signals representative of proximity and, when appropriate, it can interpret them as "hovering keystrokes"—even in the absence of physical contact between the keyboard and the user's fingers.

As the inventors hereof have recognized, it is difficult to detect hovering keystrokes with low latency. To address these, and other problems, the inventors hereof have developed systems and methods for predicting hovering keypresses based on user behavior.

SUMMARY

Embodiments of systems and methods for dynamically predicting keypresses on a hovering keyboard based on user behavior are described. In an illustrative, non-limiting embodiment, an Information Handling System (IHS) may include a processor and a memory coupled to the processor, the memory having program instructions stored thereon that, upon execution by the processor, cause the IHS to: configure a travel distance for hovering events detectable by a keyboard coupled to the IHS, and modify the travel distance in response to a user's behavior.

In some cases, the travel distance may be approximately 2 mm. The program instructions, upon execution, may cause the IHS to identify the user's behavior using a machine learning algorithm. For example, the program instructions, upon execution, may cause the IHS to classify the user into one of a plurality of different classes, and to modify the travel distance according to the classification. The IHS may modify the travel distance, at least in part, in response to execution of a selected application.

The program instructions, upon execution, may cause the IHS to: detect a first hovering event in response to a user's finger moving by at least the travel distance; and after the modification of the travel distance, detect a second hovering event in response to the user's finger moving by at least the modified travel distance. For example, the user's behavior may include a number of hovering events detected within a selected time interval. Moreover, the modified travel distance may be smaller than the travel distance. Additionally, or alternatively, the modified travel distance may be greater than the travel distance.

The program instructions, upon execution, may also cause the IHS to illuminate a region of the keyboard corresponding to a detected hovering event. For example, the IHS may cause the keyboard to illuminate such region with a color corresponding to the modified travel distance.

In another illustrative, non-limiting embodiment, a method may include: setting a minimum height for hovering events detectable by a hovering keyboard; detecting a first hovering event in response to a user's finger crossing the minimum height; based on the user's behavior, modifying the minimum height, and detecting a second hovering event in response to a user's finger crossing the modified minimum height.

For example, the user's behavior may include a minimum number of hovering events detected within a selected time interval. The modified minimum height may be higher than the minimum height.

The method may also include, in response to detection of the first hovering event, illuminating a region of the keyboard corresponding to a first hovering event with a first color or intensity corresponding to the minimum height; and in response to detection of the second hovering event, illuminating a region of the keyboard corresponding to the second hovering event with a second color or intensity corresponding to the modified minimum height.

In yet another illustrative, non-limiting embodiment, a hardware memory device may have program instructions stored thereon that, upon execution by a processor of an IHS, cause the IHS to: configure a travel distance for hovering events detectable by a keyboard coupled to the IHS, and modify the travel distance in response to a user's behavior.

In some cases, the user's behavior may include a number of hovering events detected within a selected time interval. The modified travel distance may be smaller than the travel distance in response to the number of hovering events being greater than a threshold. Additionally, or alternatively, the modified travel distance may be greater than the travel distance in response to the number of hovering events being smaller than a threshold.

The program instructions, upon execution, may further cause the IHS to illuminate a region of the keyboard corresponding to a detected hovering event with a parameter corresponding to the modified travel distance. For example, the parameter may be color and/or intensity

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 2 is a block diagram of electronic components of an IHS, according to some embodiments.

FIG. 3 is a block diagram of electronic components of a hovering keyboard, according to some embodiments.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
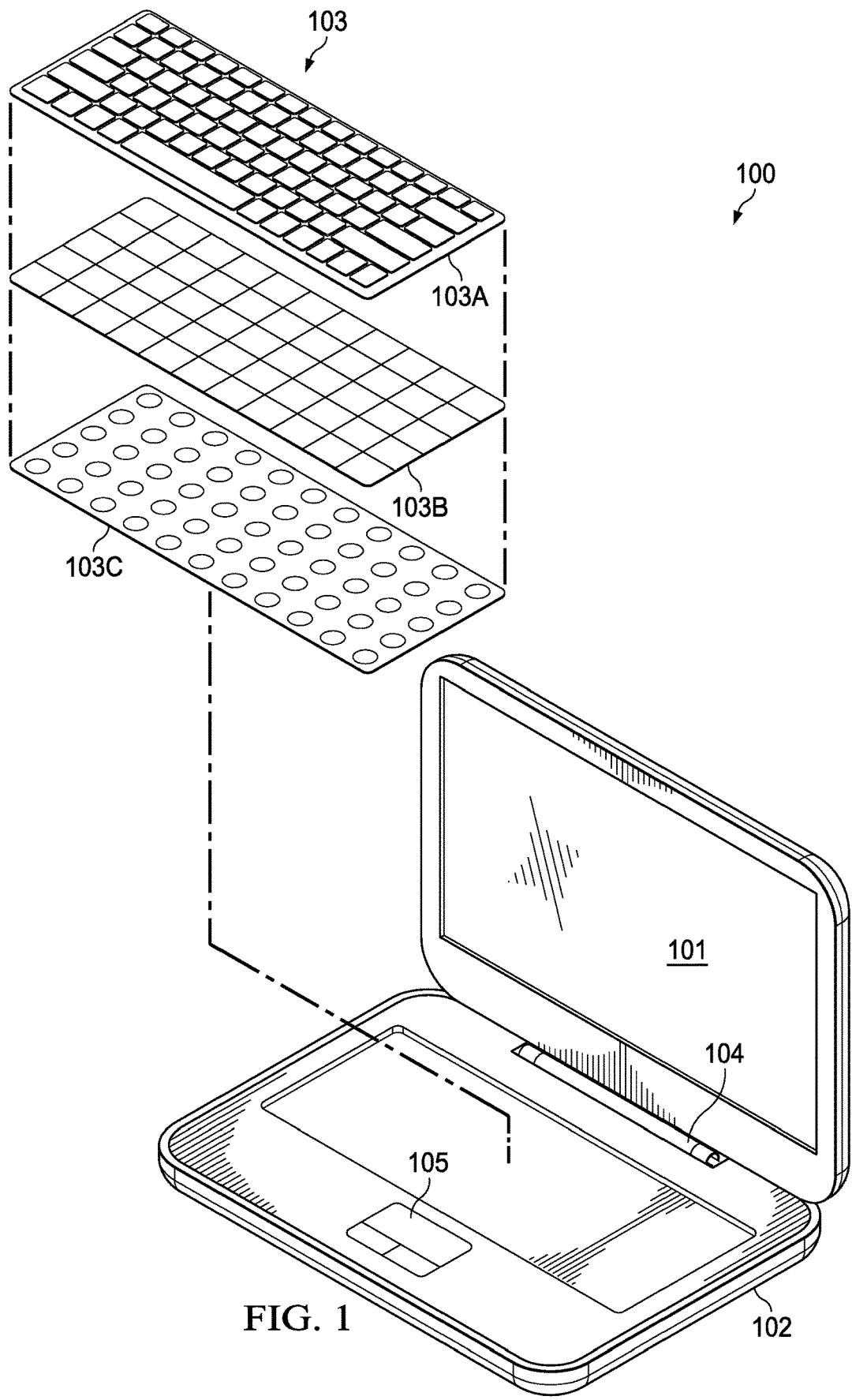
FIG. 1 is a perspective view of an Information Handling System (IHS) with a hovering keyboard, according to some embodiments.

FIG. 1 is a perspective view of Information Handling System (IHS) 100 with hovering keyboard 103. In this illustrative, non-limiting embodiment, IHS 100 includes display 101 and base or chassis 102, coupled to each other via hinge 104. Chassis 102 includes trackpad 105 or the like, and it holds keyboard 103. In this implementation, IHS 100 has a laptop or notebook form factor, such that keyboard 103 is directly integrated thereto. In other implementations, however, IHS 100 may be a desktop computer, video game console, appliance, etc., and keyboard 103 may be a peripheral keyboard separate from IHS 100. In those cases, keyboard 103 may be coupled to IHS 100 via a cable or wire (e.g., over a PS/2 connector, USB bus, etc.) or wirelessly (e.g., Bluetooth). Inputs made at keyboard 103 are communicated to keyboard controller 300 (shown in FIG. 3) for use by IHS 100.

In this example, hovering keyboard 103 is depicted with three layers or membranes: an electromechanical layer 103A, backlight illumination layer 103B, and proximity sensing layer 103C. When hovering keyboard 103 is assembled, layers 103A-C are stacked on top of each other to operate as follows: Electromechanical layer 103A is where keycap assemblies reside, and it is configured to detect physical keypresses against key caps; backlight illumination layer 103B comprises a plurality of LEDs configured to illuminate key caps from the bottom up; and proximity sensing layer is configured to detect hovering keypresses, such that in some cases, a finger's proximity to a key cap, without actually touching it, can also be detected as a keypress.

In other hovering keyboard implementations, the order in which layers 103B and 103C are stacked may be different than what is shown in FIG. 1. In some cases, layers 103A-C may be combined: for example, layers 103B and 103C may be provided as a single membrane.

With respect to electromechanical layer 103A, key caps extend out of an upper surface of keyboard 103 to provide a user with selectable inputs based upon the characters associated with the keys, such as a QWERTY keyboard that provides ASCI binary code inputs to the keyboard controller. A membrane disposed beneath keys may detect key inputs and generate a signal unique to each key. The membrane may be, for example, a flexible printed circuit board with wirelines that feed to a cable so that key inputs may be uniquely identified. Lever structures may be disposed below the keycaps to bias the keys in an upwards direction. End users provide inputs by pressing on keys to overcome the bias of these lever structures, to thereby impact the membrane.

As a person of ordinary skill in the art will recognize, hovering keyboard 103 may have a variety suitable of structures for placement of keys as individual caps (or assembled as one part) and for biasing keys (such as springs, magnets, and/or other types of devices).

Electromechanical layer 103A provides a grid of circuits underneath the keys of keyboard 103 that forms an N×M matrix. These circuits are configured to generate signals in response to the user pressing the keys. For example, the circuits may be broken underneath the keys such that, when a user depresses a given key, the electric circuit underneath that key is completed. Keyboard controller 300 receives a signal output by that circuit and compares the location of the circuit to a character map stored in its memory to determine which key was physically pressed.

Backlight illumination layer 103B may include an Organic Light Emitting Diode (OLED) material, such as an OLED film that is selectively powered with an electrical current under the control of keyboard controller 300. The OLED film be disposed at various locations of keyboard's structure in order to obtain desired illumination at selected keys. For example, the OLED film may be deposited directly on electrical contacts of membrane 103B so that a controller may selectively illuminate OLED film under any keycap, by applying an electrical current to it. In some cases, backlight illumination layer 103B may further include a lightguide structure or the like, configured to route light from its LED source to a particular keycap through keyboard 103.

Proximity sensing layer 103C provides keyboard 103 with the ability to detect keypresses without the end user making physical contact with key caps. The proximity sensors of sensing layer 103C may comprise any of a number of different types of known sensors configured to measure a distance or proximity of an object, and to produce corresponding signals in response. In some implementations, proximity sensors may overlay or lie underneath the keys of hovering keyboard 103. In other implementations, sensors may be integrated within each respective key.

In the embodiment of FIG. 1, the proximity sensors may include a grid of sensors underneath the keys of keyboard 103 disposed on layer 103C. The proximity sensors may be capacitive sensors configured such that their electric fields (sensing fields) are directed through the key caps and upward from the top surface keyboard 103. The proximity sensors are configured to detect an object such as a user's fingers, and to produce signals representative of the proximity of the object. Keyboard controller 300 may process these signals to determine the position and/or movement of the detected object relative to the proximity sensors, and to capture inputs having certain characteristics as corresponding hovering keystrokes.

In some implementations, the detection of hovering keystrokes via proximity sensing layer 103C may take place in addition, or as an alternative to, the concurrent detection of physical keystrokes by electromechanical layer 103A.

FIG. 2 is a block diagram of electronic components of IHS 100 configured to provide systems and methods for dynamically predicting keypresses on a hovering keyboard based on user behavior. IHS 100 may include one or more processors 201. In various embodiments, IHS 100 may be a single-processor system including one processor 201, or a multi-processor system including two or more processors 201. Processor(s) 201 may include any processor capable of executing program instructions, such as an INTEL PENTIUM series processor or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 that may have one or more integrated circuits coupled to processor(s) 201. In certain embodiments, the chipset 202 may utilize a DMI (Direct Media Interface) or QPI (QuickPath Interconnect) bus 203 for communicating with processor(s) 201.

Chipset 202 provides processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to graphics processor 207. In certain embodiments, graphics processor 207 may be part of one or more video or graphics cards that have been installed as components of IHS 100. Graphics processor 207 may be coupled to chipset 202 via graphics bus 206 such as provided by an Accelerated Graphics Port (AGP) bus, or a Peripheral Component Interconnect Express (PCIe) bus. In certain embodiments, graphics processor 207 generates display signals and provides them to display device 208. In certain embodiments, display device 208 may be a touch-sensitive display.

In some implementations, chipset 202 may also provide access to one or more user input devices 211. For instance, chipset 202 may be coupled to super I/O controller (SIO) 210 or an embedded controller (EC) via eSPI (Enhanced Serial Peripheral Interface) or Low-Pin Count (LPC) bus 213, and SIO 210 may provide interfaces for a variety of user input devices 211 (e.g., lower bandwidth and low data rate devices). Particularly, SIO 210 may provide access to keyboard 103 and a mouse, or other peripheral input devices such as keypads, biometric scanning devices, and voice or optical recognition devices.

SIO 210 may also provide an interface for communications with one or more sensor devices 212, which may include environment sensors, such as a temperature sensor or other cooling system sensors. These I/O devices, such as user input devices 211 and sensor devices 212, may interface with SIO 210 through wired or wireless connections.

Other resources may also be coupled to processor(s) 201 of IHS 100 through chipset 202. For example, chipset 202 may be coupled to network interface 209, such as a Network Interface Controller (NIC). In certain embodiments, network interface 209 may be coupled to chipset 202 via a PCIe bus. Network interface 209 may support communication via various wired and/or wireless networks.

Chipset 202 may also provide access to one or more hard disk and/or solid state drives 215. In certain embodiments, chipset 202 may also provide access to one or more optical drives 214 or other removable-media drives. Any or all of drive devices 214 and 215 may be integral to IHS 100, or they may be located remotely. Chipset 202 may also provide access to one or more Universal Serial Bus (USB) ports 216.

In certain implementations, chipset IHS 202 may support an I²C (Inter-Integrated Circuit) bus that may be used to communicate with various types of microcontrollers, microprocessor and integrated circuits that are typically integrated components of the motherboard of the IHS 100 and perform specialized operations. For example, such an I²C bus may be utilized to transmit and receive keystroke and hovering keystroke information from an attached keyboard device, and to provide that information to an operating system (OS) executed by IHS 100.

Another resource that may be accessed by processor(s) 201 via chipset 202 is Basic Input/Output System (BIOS) 217. Upon booting of IHS 100, processor(s) 201 may utilize BIOS 217 instructions to initialize and test hardware components coupled to IHS 100 and to load an OS for use by IHS 100. BIOS 217 provides an abstraction layer that allows the OS to interface with certain hardware components that are utilized by IHS 100. The Unified Extensible Firmware Interface (UEFI) was designed as a successor to BIOS; many modern IHSs utilize UEFI in addition to or instead of a BIOS. As used herein, BIOS is also intended to encompass UEFI.

Chipset 202 may also provide an interface for communications with one or more sensors 212. Sensors 212 may be disposed within display 101, chassis 102, keyboard 103, hinge 104, and/or trackpad 105, and may include, but are not limited to: electric, magnetic, radio, optical, infrared, thermal, force, pressure, acoustic, ultrasonic, proximity, position, deformation, bending, direction, movement, velocity, gyroscope, rotation, and/or acceleration sensor(s).

In various embodiments, keyboard controller 300 (shown in FIG. 3) may utilize different interfaces for communicating with the OS of IHS 100. For instance, keyboard controller 300 may interface with the chipset 202 via super I/O controller 210.

FIG. 3 is a block diagram of electronic components of hovering keyboard 103. As depicted, components of keyboard 103 include keyboard controller or processor 300 coupled to electromechanical module 301, lighting module 302, and proximity module 303. Each of modules 301-303 may include electronic circuits and/or program instructions that enable that module to communicate with keyboard controller 300.

Electromechanical module 301 may be used to control the operation of and/or to detect events originated by electromechanical layer 103A, lighting module 302 may be used to control the operation of backlight illumination layer 103B, and proximity module 303 may be used to control the operation of and/or to detect events originated by proximity sensing layer 103C. In other implementations, an additional wireless communication module (not shown) may be coupled to keyboard controller 300 to enable communications between keyboard 103 and IHS 100 using a suitable wireless protocol.

Keyboard controller 300 may be configured to detect and identify individual physical keypresses or keystrokes made by the end user via electromechanical layer 103A. Keyboard controller or processor 300 may also be configured to control the operation of each individual LED of backlight illumination layer 103B using parameters such as, for example, a selected location (e.g., in an N×M matrix, as an identified key or set of keys, etc.), a selected color (e.g., when the backlight includes RGB LEDs), and a selected intensity (e.g., brighter or dimmer). In addition, keyboard controller 300 may be configured to detect and identify individual hovering keypresses made by the end user via proximity sensing layer 103C.

In various embodiments, IHS 100 and/or hovering keyboard 103 may not include all of components shown in FIGS. 2 and 3, respectively. Additionally, or alternatively, IHS 100 and/or hovering keyboard 103 may include components in addition to those shown in FIGS. 2 and 3, respectively. Additionally, or alternatively, components represented as discrete in FIGS. 2 and 3 may instead be integrated with other components. For example, all or a portion of the functionality provided by these various components may be provided as a System-On-Chip (SOC), or the like.

Figure 4:
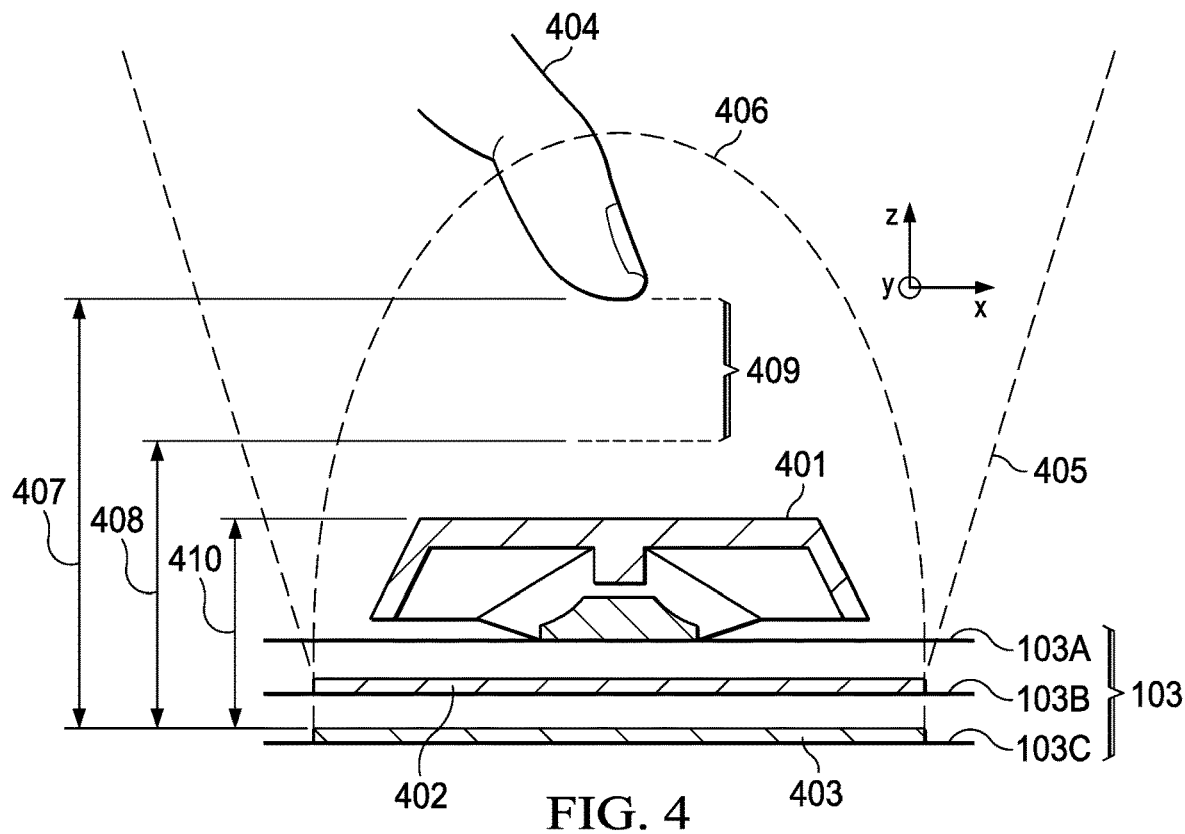
FIG. 4 is sectional view of a hovering keyboard in operation, according to some embodiments.

FIG. 4 is sectional view of hovering keyboard 103 in operation, according to some embodiments. As depicted, hovering keyboard 103 includes electromechanical layer 103A, backlight illumination layer 103B, and proximity sensing layer 103C. Electromechanical layer 103A hosts a key assembly, which includes keycap 401 as well as a dome, switches, and/or levers configured to receive and capture physical keystrokes.

Backlight illumination layer 103B includes lighting element 402 under key assembly 401. Illumination element 402 may include one or more LEDs (or one or more transparent areas from where light can exist a light guide, for example) that are configured to shine light 405, using one or more selected parameters (e.g., color, intensity, etc.), under keycap 401. In some cases, element 402 may be disposed in a matrix of like elements as part of backlight illumination layer 103B, each element located under a corresponding key of electromechanical layer 103A.

Proximity sensing layer 103C includes proximity sensor 403 under key assembly 401, such as a capacitive sensor, an infrared sensor, or an ultrasonic sensor that is configured to provide sensing field 406. Examples of suitable proximity sensors include GESTIC sensors from Microchip Technology Inc. In some cases, proximity sensor 403 may be disposed in a matrix of similar elements on proximity sensing layer 103C, and each proximity sensor may be located under a respective key of electromechanical layer 103A.

In this example, assume that the user's finger or fingertip 404 is resting at position 407 relative to proximity sensing layer 103C. When finger 404 travels by a selected or configurable distance 409 (in the vertical axis "z") to position 408 from proximity sensing layer 103C, the disturbance caused by the user's finger 404 upon sense field 406 triggers detection of a hovering keypress corresponding to keycap 401—without finger 404 having to touch keycap 401.

In some cases, height 407 may be configured to become aligned with the height of keycap 401, shown here as height 410. In that case, a hovering keypress can be detected when key cap 401 travels by distance 409 (e.g., 1 mm or 2 mm) from its initial position—a shorter travel distance (and less force) than a physical keypress would require.

Figure 5:
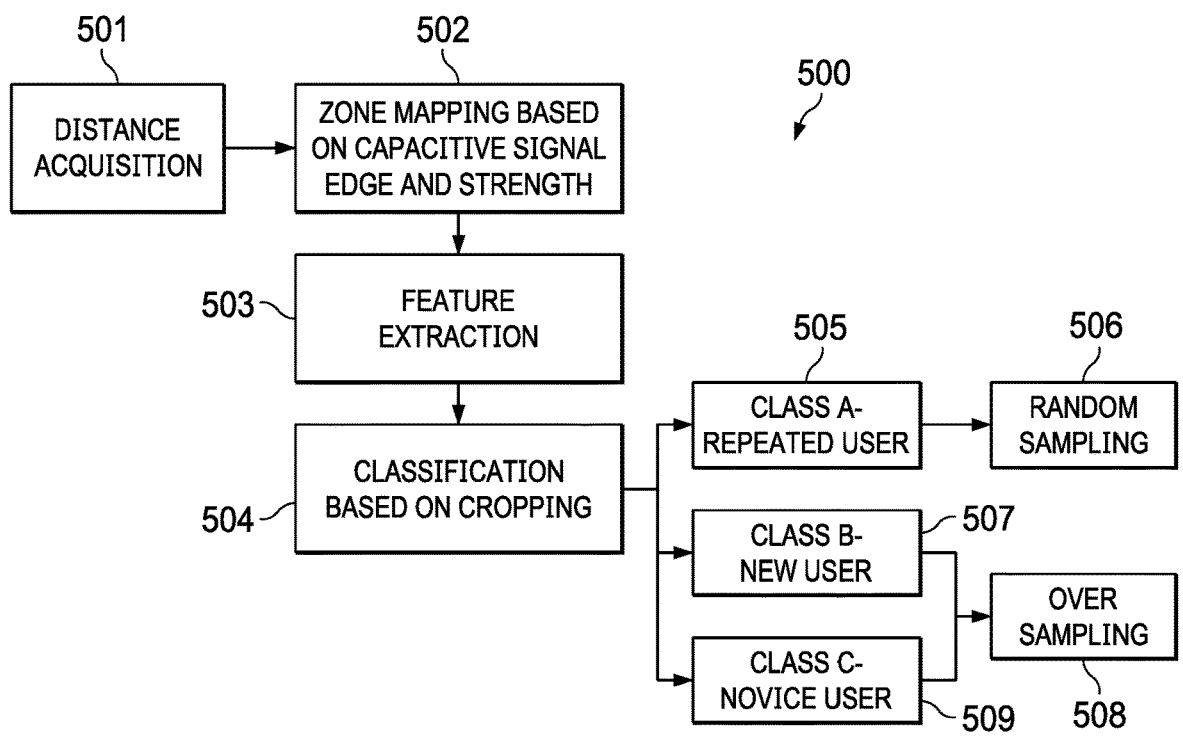
FIG. 5 is a flowchart of a method for predicting keypresses on a hovering keyboard based on user behavior, according to some embodiments.

FIG. 5 is a flowchart of method 500 for predicting hovering keypresses on hovering keyboard 103 based on user behavior. In various implementations, program instructions for executing method 500 may be stored in memory 205 and executable by processor(s) 201. In some cases, method 500 may be performed by one or more standalone software applications, drivers, libraries, or toolkits, accessible via an Application Programming Interface (API) or the like. Additionally, or alternatively, method 500 may be performed by the IHS's OS.

At block 501, method 500 includes acquiring, measuring, or detecting distances between the user's fingertips and keyboard 103. These distances may be obtained with respect to the keycaps, or with respect to proximity sensing layer 103C, over a selected period of time. Then, block 502 maps different zones of keyboard 103 based on detected a capacitive signal edge and strength. For example, block 502 may split the keys of keyboard 103 into different groups or zones, such as function keys, a number pad, etc., depending upon the strength of the signals detected by the given proximity sensors while the user operates hovering keyboard 103.

At block 503, method 500 performs feature extraction based upon data obtained in blocks 501 and 502. Particularly, patterns of movement that correlate fingertip distances, keyboard zones, and times may be extracted from the data based on selected criteria to create feature vectors representative of the user's behavior. Then, at block 504, method 500 classifies feature vectors after a cropping operation. As the feature vectors drift over time—e.g., due to the user's fatigue—thresholds used for cropping the feature vector can be dynamically changed, in order to keep up with the new or altered behavior.

As a result of the classification operation of block 504, the user may be classified as a repeated or known user ("Class A"), a new user ("Class B"), or a novice user ("Class C"), depending upon the detected behaviors. In other examples, however, other classification schemes may be used. But here, if the user is classified into Class A, method 500 performs random sampling during subsequent distance acquisition operations. For example, the user may have an established behavior profile and method 500 may be used to make sure the user is still operating within the parameters of such a profile. On the other hand, if the user is classified into Classes B or C, method 500 performs over sampling of subsequent distance acquisition operations to increase the speed of the machine learning (ML) algorithm.

As such, the proximity sensing mechanisms described herein can be used by method 500 to predict the proximity of a user's finger to a key, and to gauge the key travel distance. Based on learned user behavior, method 500 may be used to predict hovering keypresses and/or to make configuration changes ahead of time. For example, in many cases, travel distance and hovering keypress triggers can be configured differently for the first event and for subsequent, repeated events (e.g., to accommodate a gaming application).

By implementing method 500, keypress-to-keypress latency is reduced for hovering keypresses. A user may configure key travel distances for each user based on their preferences, and method 500 may further learn the key press behavior and optimize the hovering key to a given user. For example, in a situation where the initial travel distance is set to 2 mm, application of method 500 may reconfigure the action to be triggered by 1 mm or less.

IHS 100 may configure a travel distance (or minimum height) for hovering events (e.g., 2 mm), and it may then modify the initial travel distance (e.g., from 2 mm to 1 mm) in response to the user's behavior. As an example, the user's behavior may include a number of repeated hovering keypresses within a period of time, which can be a typical behavior in certain types of applications (e.g., gaming) that require low latency between keypress-to-keypress detection.

With respect to repeated hovering keypresses (during a selected period of time), the modified travel distance may be made smaller than a current travel distance in response to the number of hovering keypresses being greater than a threshold value. Additionally, or alternatively, the modified travel distance may be made greater than a current travel distance in response to the number of hovering keypresses being smaller than the threshold value.

As another example, the user's behavior may include a resting position of the user's hands on certain keycaps (which can be different from user-to-user), and the travel distance may be increased (or the proximity sensors may be turned off, or their data discarded) in keyboard zones where the user's fingers are expected to rest, once such behavior is detected.

Depending upon the class of the user, IHS 100 may modify the travel distance by a different amount. For example, in the same scenario, IHS 100 may change the minimum travel distance to 1 mm for repeated or known users of Class A, and to 1.5 mm for new or novice users of Classes B and C.

As the user continues to operate IHS 100, method 500 adjusts the minimum travel distance (or height) required for detecting hovering keypresses up or down, depending upon the behavior detected. Moreover, in addition to modifying the travel distance, IHS 100 may also provide a visual indication of its present setting.

Particularly, IHS 100 may use elements of backlight illumination layer 103B to illuminate a region of the keyboard corresponding to a detected hovering keypress. As the user's finger approaches a keycap and enters the detection zone of a given proximity sensor in proximity sensing layer 103C, an LED element from backlight illumination layer 103B may shine light under that particular keycap. As the user's finger approaches and then retreats from the keycap, without necessarily touching the keycap, the underlying LED element may be turned on and off, and/or may have its brightness made proportional to the amount of capacitive disturbance created by the finger in sense field 406 (which in turn is proportional to the finger's proximity to the keycap).

Additionally, or alternatively, the light source under each keycap or keyboard zone may have one or more parameters controlled to indicate the amount of travel distance being enforced. For example, when the travel distance is relatively large (2 mm), the LED may shine a blue light of low intensity under the keycap or zone. If the user's behavior causes the travel distance to be reduced (1 mm), for example, due to an increased number of attempted hovering keypresses per unit time, the same LED may now shine a green light of middle intensity to indicate an increased hovering keypress sensitivity in that zone or key. Then, if the user's behavior causes the travel distance to be reduced even further (0.5 mm), the same LED may now shine a red light of high intensity to indicate a yet increased (or maximum) hovering keypress sensitivity. Then if the user's behavior causes the travel distance to be increased (back to 1 or 2 mm), for example, due to a reduced number of attempted hovering keypresses per unit time, the LED returns to green or blue light of middle or low intensity, respectively, to indicate a reduced sensitivity to hovering keypress and larger travel distance.

In some cases, in addition or as an alternative to illuminating keyboard 103, a heat map or the like may be rendered on a Graphical User Interface (GUI) provided by IHS 100 on display 101 to show, to the user, the different zones of hovering keyboard 103, the current proximity to the user's fingers, and/or the different travel distances required to detect a hovering keystroke in a respective zone.

It should be understood that various operation described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
configure a travel distance for hovering events detectable by a keyboard coupled to the IHS, wherein the travel distance is the distance a user's finger moves between an initial position of the user's finger and a position above the keyboard that triggers the detectable event; and
modify the travel distance into a modified travel distance in response to a behavior of the user.

2. The IHS of claim 1, wherein the travel distance is 2 mm.

3. The IHS of claim 1, wherein the program instructions, upon execution, further cause the IHS to identify the user's behavior using a machine learning algorithm.

4. The IHS of claim 3, wherein the program instructions, upon execution, further cause the IHS to classify the user into one of a plurality of different classes, and to modify the travel distance according to the classification.

5. The IHS of claim 1, wherein the program instructions, upon execution, further cause the IHS to modify the travel distance, at least in part, in response to execution of a selected application.

6. The IHS of claim 1, wherein the program instructions, upon execution, further cause the IHS to:
   detect a first hovering event in response to a user's finger moving by at least the travel distance; and
   after a modification of the travel distance, detect a second hovering event in response to the user's finger moving by at least the modified travel distance.

7. The IHS of claim 6, wherein the modified travel distance is smaller than the travel distance.

8. The IHS of claim 6, wherein the modified travel distance is greater than the travel distance.

9. The IHS of claim 1, wherein the user's behavior comprises a number of hovering events detected within a selected time interval.

10. The IHS of claim 1, wherein the program instructions, upon execution, further cause the IHS to illuminate a region of the keyboard corresponding to a detected hovering event.

11. The IHS of claim 10, wherein the program instructions, upon execution, further cause the IHS to illuminate the region of the keyboard with a color corresponding to the modified travel distance.

12. A method, comprising:
   setting a minimum height and a minimum travel distance for hovering events detectable by a hovering keyboard, wherein the travel distance is the distance between an initial position of a user's finger and the minimum height;
   detecting a first hovering event in response to a user's finger crossing the minimum height and exceeding the minimum travel distance;
   based on a behavior of the user, modifying the minimum travel distance to a modified travel distance; and
   detecting a second hovering event in response to the user's finger movement exceeding the modified travel distance.

13. The method of claim 12, wherein the user's behavior comprises a minimum number of hovering events detected within a selected time interval.

14. The method of claim 13, wherein the modified minimum travel distance is shorter than the minimum travel distance.

15. The method of claim 13, further comprising:
   illuminating a region of the keyboard corresponding to a hovering event with a first color or intensity corresponding to the minimum height.

16. A hardware memory device having program instructions stored thereon that, upon execution by a processor of an Information Handling System (IHS), cause the IHS to:
   configure a travel distance for hovering events detectable by a keyboard coupled to the IHS, wherein the travel distance is the distance of a user's finger movement between an initial position of the user's finger and a position above the keyboard that triggers the detectable event; and
   modify the travel distance in response to the user's behavior.

17. The hardware memory device of claim 16, wherein the user's behavior comprises a number of hovering events detected within a selected time interval.

18. The hardware memory device of claim 17, wherein the modified travel distance is smaller than the travel distance in response to the number of hovering events being greater than a threshold.

19. The hardware memory device of claim 17, wherein the modified travel distance is greater than the travel distance in response to the number of hovering events being smaller than a threshold.

20. The hardware memory device of claim 16, wherein the program instructions, upon execution, further cause the IHS to illuminate a region of the keyboard corresponding to a detected hovering event with a parameter corresponding to the modified travel distance, and wherein the parameter is at least one of: color or intensity.

* * * * *